United States Patent
Wang

(10) Patent No.: US 11,776,143 B2
(45) Date of Patent: Oct. 3, 2023

(54) FOREIGN MATTER DETECTION DEVICE, FOREIGN MATTER DETECTION METHOD, AND PROGRAM

(71) Applicant: NEC Corporation, Tokyo (JP)

(72) Inventor: Zhenwei Wang, Tokyo (JP)

(73) Assignee: NEC CORPORATION, Tokyo (JP)

( * ) Notice: Subject to any disclaimer, the term of this patent is extended or adjusted under 35 U.S.C. 154(b) by 208 days.

(21) Appl. No.: 17/438,561

(22) PCT Filed: Mar. 28, 2019

(86) PCT No.: PCT/JP2019/013550
§ 371 (c)(1),
(2) Date: Sep. 13, 2021

(87) PCT Pub. No.: WO2020/194650
PCT Pub. Date: Oct. 1, 2020

(65) Prior Publication Data
US 2022/0148205 A1    May 12, 2022

(51) Int. Cl.
 G06K 9/00 (2022.01)
 G06T 7/50 (2017.01)
 G06V 10/762 (2022.01)
(52) U.S. Cl.
 CPC .............. *G06T 7/50* (2017.01); *G06V 10/762* (2022.01); *G06T 2207/10028* (2013.01)
(58) Field of Classification Search
 CPC ................................ G06T 7/50; G06V 10/762
 See application file for complete search history.

(56) References Cited

U.S. PATENT DOCUMENTS

| 8,825,260 B1* | 9/2014 | Silver ................... G01S 13/931 342/159 |
| 9,052,721 B1* | 6/2015 | Dowdall ................ B64D 45/00 |
| 2010/0106356 A1* | 4/2010 | Trepagnier ........... G05D 1/0248 701/25 |

(Continued)

FOREIGN PATENT DOCUMENTS

| CN | 107563256 A | * | 1/2018 | ......... G06K 9/00798 |
| CN | 108268483 A | * | 7/2018 | |

(Continued)

OTHER PUBLICATIONS

An Efficient Contour Based Fine-Grained Algorithm for Multi Category Object Detection, Rafflesia Khan et al., JOIG, Dec. 2018, pp. 127-136 (Year: 2018).*

(Continued)

*Primary Examiner* — Jayesh A Patel
(74) *Attorney, Agent, or Firm* — Sughrue Mion, PLLC

(57) ABSTRACT

A measurement information acquisition unit acquires depth information indicating a depth in a detection range measured by a depth measurement device that measures the depth. An image acquisition unit acquires an image of the detection range captured by an imaging device that captures the image. A depth extraction unit extracts partial depth information in which a portion not being subject to a determination of being foreign matter or not is removed from the depth information, based on the acquired image. A foreign matter determination unit determines presence or absence of foreign matter in the detection range based on the partial depth information.

6 Claims, 7 Drawing Sheets

(56) References Cited

U.S. PATENT DOCUMENTS

| | | | |
|---|---|---|---|
| 2010/0157280 A1 | 6/2010 | Kusevic | |
| 2011/0123135 A1* | 5/2011 | Hsieh | G06T 7/73 382/285 |
| 2011/0282581 A1* | 11/2011 | Zeng | G01S 17/89 701/301 |
| 2012/0269384 A1* | 10/2012 | Jones | G06V 20/64 382/103 |
| 2014/0032012 A1* | 1/2014 | Joshi | G05D 1/0257 701/1 |
| 2016/0086052 A1* | 3/2016 | Piekniewski | G06T 7/292 382/103 |
| 2017/0144587 A1* | 5/2017 | Ogawa | B60Q 1/0023 |
| 2017/0285916 A1* | 10/2017 | Xu | G06T 11/60 |
| 2017/0371348 A1* | 12/2017 | Mou | G06V 20/56 |
| 2018/0060700 A1* | 3/2018 | Bleyer | G06T 7/10 |
| 2018/0188045 A1* | 7/2018 | Wheeler | G06F 18/22 |
| 2018/0232947 A1* | 8/2018 | Nehmadi | G01S 7/295 |
| 2018/0330475 A1* | 11/2018 | Tokatyan | G06T 7/001 |
| 2019/0180502 A1* | 6/2019 | Englard | G01S 7/417 |
| 2019/0234728 A1* | 8/2019 | Li | G06T 7/521 |
| 2021/0286082 A1 | 9/2021 | Ohki | |

FOREIGN PATENT DOCUMENTS

| | | | | |
|---|---|---|---|---|
| CN | 108268518 A | * | 7/2018 | |
| CN | 108550139 A | * | 9/2018 | |
| CN | 106204705 B | * | 12/2018 | G06T 15/00 |
| EP | 3151164 A2 | * | 4/2017 | G06K 9/00771 |
| JP | 2007-255978 A | | 10/2007 | |
| JP | 2011-112644 A | | 6/2011 | |
| JP | 2016-009474 A | | 1/2016 | |
| JP | 2016009474 A | * | 1/2016 | |
| JP | 2018-066701 A | | 4/2018 | |
| WO | WO-2012115594 A1 | * | 8/2012 | G06K 9/00771 |
| WO | 2018/190252 A1 | | 10/2018 | |

OTHER PUBLICATIONS

Study on the Method of Transmission line Foreign Body Detection based on Deep Learning, Bixiao Wang et al., IEEE, 2017, pp. 1-5 (Year: 2017).*

Advanced Deep-Learning Techniques for Salient and Category-Specific Object Detection, Junwei Han et al., DLFVU, Jan. 2018, pp. 84-100 (Year: 2018).*

Ranking Regions of Visual Saliency in RGB-D Content, Dylan Seychell et al., IEEE, 2018, pp. 1-8 (Year: 2018).*

Combining RGB and ToF Cameras for Real-time 3D Hand Gesture Interaction, Michael Van den Bergh et al., IEEE, 2010, pp. 66-72 (Year: 2010).*

International Search Report for PCT Application No. PCT/JP2019/013550, dated Jun. 11, 2019.

* cited by examiner

FOREIGN MATTER DETECTION DEVICE, FOREIGN MATTER DETECTION METHOD, AND PROGRAM This application is a National Stage Entry of PCT/JP2019/013550 filed on Mar. 28, 2019, the contents of all of which are incorporated herein by reference, in their entirety.

TECHNICAL FIELD

The present invention relates to a foreign matter detection device, a foreign matter detection method, and a program.

BACKGROUND ART

Patent Document 1 discloses a technique of using a stereo camera and LiDAR (Light Detection and Ranging) to acquire a plurality of feature amounts of an object existing in the detection range and differentiate between objects existing in the detection range.

Further, Patent Document 2 discloses a technique for determining the presence or absence of an obstacle based on the distance feature amount of an object measured by a distance measuring device in a monitoring area.

PRIOR ART DOCUMENTS

Patent Documents

[Patent Document 1] Japanese Unexamined Patent Application, First Publication No. 2007-255978
[Patent Document 2] PCT International Publication No. WO 2018/190252

SUMMARY OF THE INVENTION

Problem to be Solved by the Invention

According to stereo camera and LiDAR technology, information within the detection range can be obtained as point cloud data. However, when the foreign matter determination process is performed for each point constituting the point cloud, the amount of calculation becomes enormous.

The present invention has been made in view of the above problem, and one of the objects thereof is to provide a foreign matter detection device, a foreign matter detection method, and a program capable of realizing foreign matter determination with a small amount of calculation.

Means for Solving the Problem

According to the first example aspect of the present invention, a foreign matter detection device includes: a measurement information acquisition unit that acquires depth information indicating a depth in a detection range measured by a depth measurement device that measures the depth; an image acquisition unit that acquires an image of the detection range captured by an imaging device that captures the image; a depth extraction unit that extracts partial depth information in which a portion not being subject to a determination of being foreign matter or not is removed from the depth information, based on the acquired image; and a foreign matter determination unit that determines presence or absence of foreign matter in the detection range based on the partial depth information.

According to the second example aspect of the present invention, a foreign matter detection method includes: acquiring, by a computer, depth information indicating a depth in a detection range measured by a depth measurement device that measures the depth; acquiring, by the computer, an image of the detection range captured by an imaging device that captures the image; extracting, by the computer, partial depth information in which a portion not being subject to a determination of being foreign matter or not is removed from the depth information, based on the acquired image; and determining, by the computer, presence or absence of foreign matter in the detection range based on the partial depth information.

According to the third example aspect of the present invention, a program causes a computer to execute the steps of: acquiring depth information indicating a depth in a detection range measured by a depth measurement device that measures the depth; acquiring an image of the detection range captured by an imaging device that captures the image; extracting partial depth information in which a portion not being subject to a determination of being foreign matter or not is removed from the depth information, based on the acquired image; and determining presence or absence of foreign matter in the detection range based on the partial depth information.

Effect of Invention

According to at least one of the above example aspects, the foreign matter detection device can realize the determination of foreign matter with a small amount of calculation.

EXAMPLE EMBODIMENT

First Example Embodiment

<Configuration of Foreign Matter Detection Device>

Figure 1:
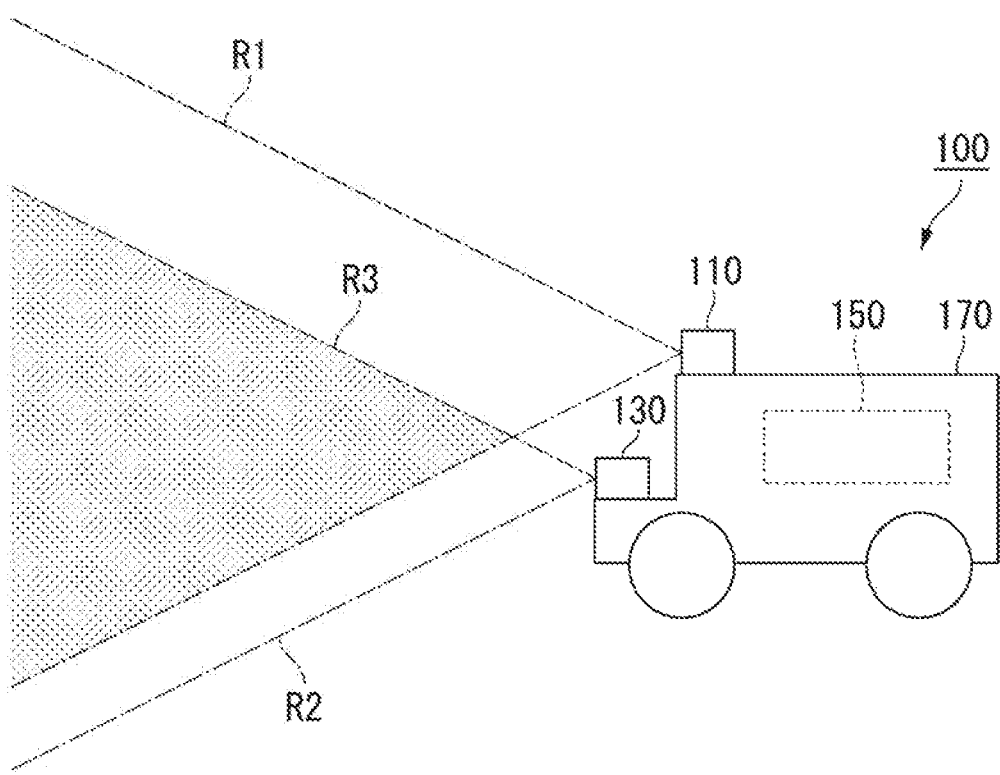
FIG. 1 is an outline diagram showing the constitution of the foreign matter detection device according to the first example embodiment.

FIG. 1 is an outline diagram showing the configuration of the foreign matter detection device according to the first example embodiment.

The foreign matter detection device 100 includes a LiDAR 110, a camera 130, a processing device 150, and a robot 170.

The LiDAR 110, the camera 130, and the processing device 150 are mounted on the robot 170. The robot 170 includes a moving device such as wheels.

The LiDAR 110 measures the depth of the outside world and generates point cloud data indicating the depth at a plurality of detection points. The LiDAR 110 is an example of a depth measuring device, and the point cloud data is an example of depth information. The LiDAR 110 measures the depth ahead of the robot 170 in the advancing direction.

The camera 130 captures images ahead of the robot 170 in the advancing direction and generates image data. The camera 130 is an example of an imaging device. The depth measurement range R1 by the LiDAR 110 and the imaging range R2 of the camera 130 have at least overlapping portions.

The processing device 150 detects foreign matter existing in a range where a detection range R3 of the LiDAR 110 and the imaging range R2 of the camera 130 overlap, on the basis of the measurement information of the LiDAR 110 and the camera 130. That is, the portion where the depth measurement range R1 by the LiDAR 110 and the imaging range R2 of the camera 130 overlap is the foreign matter detection range R3 by the foreign matter detection device 100.

<Functional Configuration of Processing Equipment>

Figure 2:
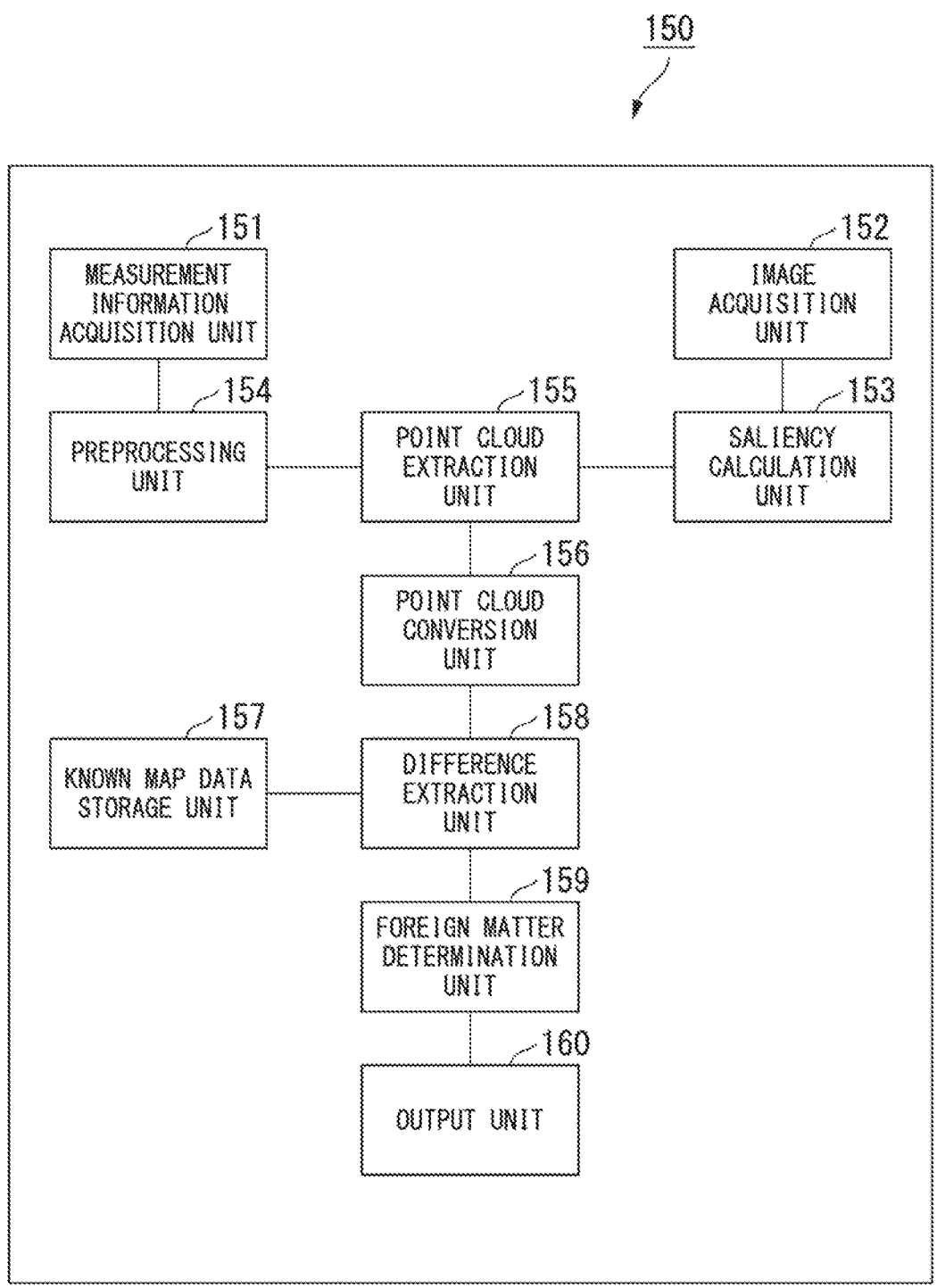
FIG. 2 is a block diagram illustrating a functional configuration of a processing device of the foreign matter detection device according to the first example embodiment.

FIG. 2 is a block diagram illustrating the functional configuration of the processing device of the foreign matter detection device according to the first example embodiment.

The processing device 150 includes a measurement information acquisition unit 151, an image acquisition unit 152, a saliency calculation unit 153, a preprocessing unit 154, a point cloud extraction unit 155, a point cloud conversion unit 156, a known map data storage unit 157, a difference extraction unit 158, a foreign matter determination unit 159 and an output unit 160.

The measurement information acquisition unit 151 acquires point cloud data from the LiDAR 110.

The image acquisition unit 152 acquires image data from the camera 130.

The saliency calculation unit 153 obtains a saliency map from the image data acquired by the image acquisition unit 152. The saliency map is an image in which a portion of the image that is easily observed is represented as a heat map. That is, the saliency map is an image showing the saliency at each pixel of the image data. For example, the saliency calculation unit 153 can obtain the characteristics of the frequency spectrum of the image data and calculate the saliency from the magnitude of the difference with a frequency spectrum model of a natural image obtained in advance. Further, for example, the saliency calculation unit 153 may calculate the saliency by the gradient edge of the image, the color, the amount of change in the pixel value with time series, and an inference by deep learning.

The preprocessing unit 154 performs preprocessing such as outlier processing and filtering on the point cloud data acquired by the measurement information acquisition unit 151. As preprocessing, the preprocessing unit 154 may additionally perform noise removal, boundary line determination, and ground and wall removal by flat surface determination.

The point cloud extraction unit 155 extracts a portion (partial point cloud data) corresponding to a pixel whose saliency is higher than a predetermined threshold value from the point cloud data preprocessed by the preprocessing unit 154 based on the saliency map generated by the saliency calculation unit 153. The partial point cloud data extracted by the point cloud extraction unit 155 is an example of partial depth information.

That is, in the first example embodiment, a portion whose saliency is equal to or less than a predetermined threshold value is not a target for determining whether or not it is foreign matter.

The point cloud conversion unit 156 converts the partial point cloud data extracted by the point cloud extraction unit 155 into voxel data. The point cloud conversion unit 156 can reduce the amount of calculation and the memory usage capacity by converting the partial point cloud data into voxel data. The voxel data converted from the partial point cloud data is an example of partial depth information.

The known map data storage unit 157 stores the known map data obtained before the start of the foreign matter detection process. The known map data may be, for example, a three-dimensional environment map generated by SLAM (Simultaneous Localization and Mapping) technology using the LiDAR 110. The known map data is an example of reference depth information indicating the depth when no foreign matter is present in the detection range.

The difference extraction unit 158 compares the voxel data generated by the point cloud conversion unit 156 with the known map data stored by the known map data storage unit 157, and extracts those voxels that do not exist in the known map data among each voxels of the voxel data. At this time, the difference extraction unit 158 performs matching of the known map data and the voxels with a predetermined error range.

The foreign matter determination unit 159 determines whether or not foreign matter is present in the detection region. Further, when foreign matter is present in the detection region, the foreign matter determination unit 159 obtains the number of pieces of foreign matter, and the size and barycentric coordinates of each piece of foreign matter. Specifically, the foreign matter determination unit 159 clusters the voxels extracted by the difference extraction unit 158, and on the basis of the cluster obtains the number of pieces of foreign matter, and the size and barycentric coordinates of each piece of foreign matter.

The output unit 160 outputs the result of the foreign matter determination unit 159. For example, the output unit 160 may display the result on a display (not shown), may output the result to an external server device, or may record the result on an internal storage medium.

<Foreign Matter Detection Method>

Figure 3:
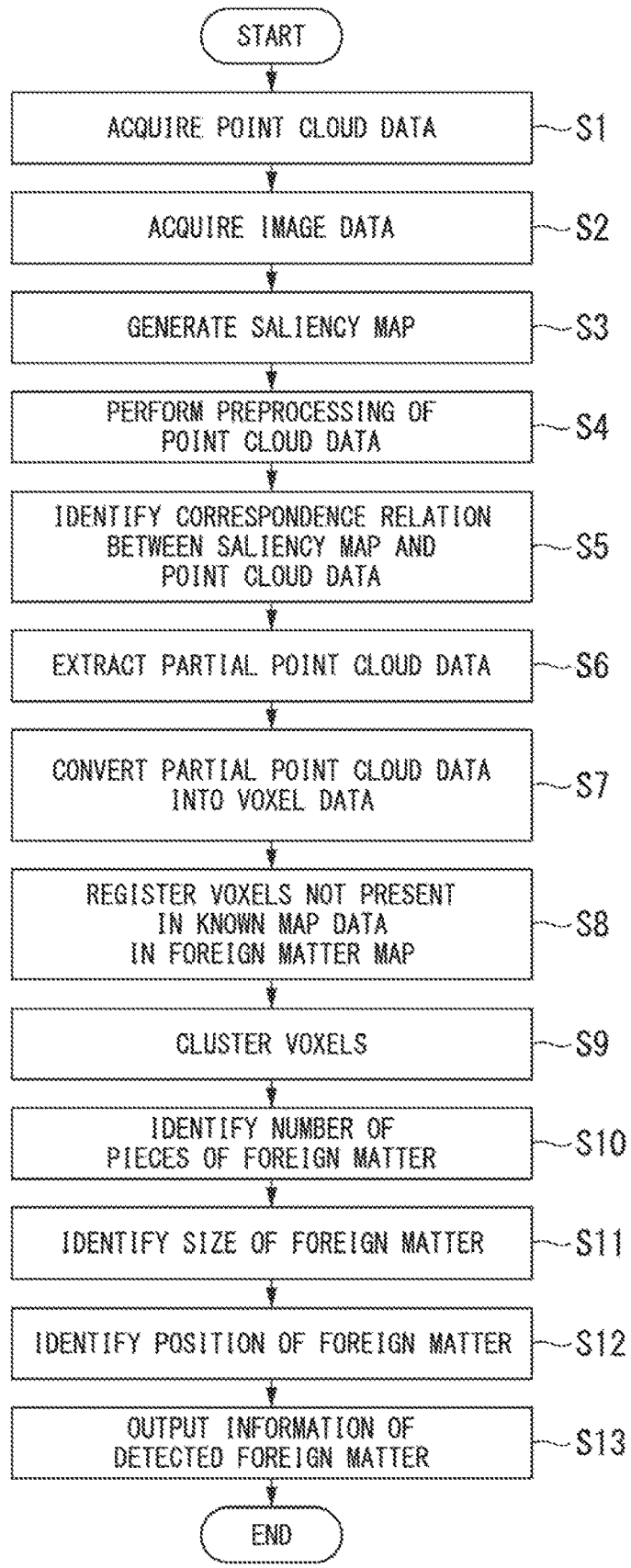
FIG. 3 is a flowchart showing a foreign matter detection method by the foreign matter detection device according to the first example embodiment.

FIG. 3 is a flowchart showing the foreign matter detection method by the foreign matter detection device according to the first example embodiment.

The measurement information acquisition unit 151 acquires point cloud data from the LiDAR 110 (Step S1). The image acquisition unit 152 acquires image data from the camera 130 (Step S2).

The saliency calculation unit 153 generates a saliency map from the image data acquired in Step S2 (Step S3). The preprocessing unit 154 performs preprocessing of the point cloud data acquired in Step S1 (Step S4). The point cloud extraction unit 155 identifies the correspondence between the saliency map generated in Step S3 and the point cloud data preprocessed in Step S4 on the basis of the relative positions and orientations of the LiDAR 110 and the camera 130 (Step S5).

The point cloud extraction unit extracts the partial point cloud data corresponding to pixels whose saliency exceeds a predetermined threshold value in the saliency map generated in Step S3 from the point cloud data preprocessed in Step S4 on the basis of the correspondence relationship specified in Step S5 (Step S6). The point cloud conversion unit 156 converts the partial point cloud data extracted in Step S6 into voxel data (Step S7).

The difference extraction unit 158 compares the voxel data generated in Step S7 with the known map data stored in the known map data storage unit 157, extracts voxels not present in the known map data from each voxel of the voxel data, and registers the voxels in a foreign matter map (Step S8). The foreign matter determination unit 159 performs a clustering process for each voxel of the foreign matter map (Step S9). The foreign matter determination unit 159 identifies the number of clusters detected in Step S9 as the number of pieces of foreign matter (Step S10). The foreign matter determination unit 159 identifies the size of the foreign matter based on the range of voxels in each cluster detected in Step S9 (Step S11). The position of the foreign matter is identified based on the barycentric position of the voxel in each cluster detected in Step S9 (Step S12). The output unit 160 outputs the number of the identified pieces of foreign matter, and the size and barycentric position of each piece of foreign matter (Step S13).

Specific Example of Foreign Matter Detection Method

Figure 4:
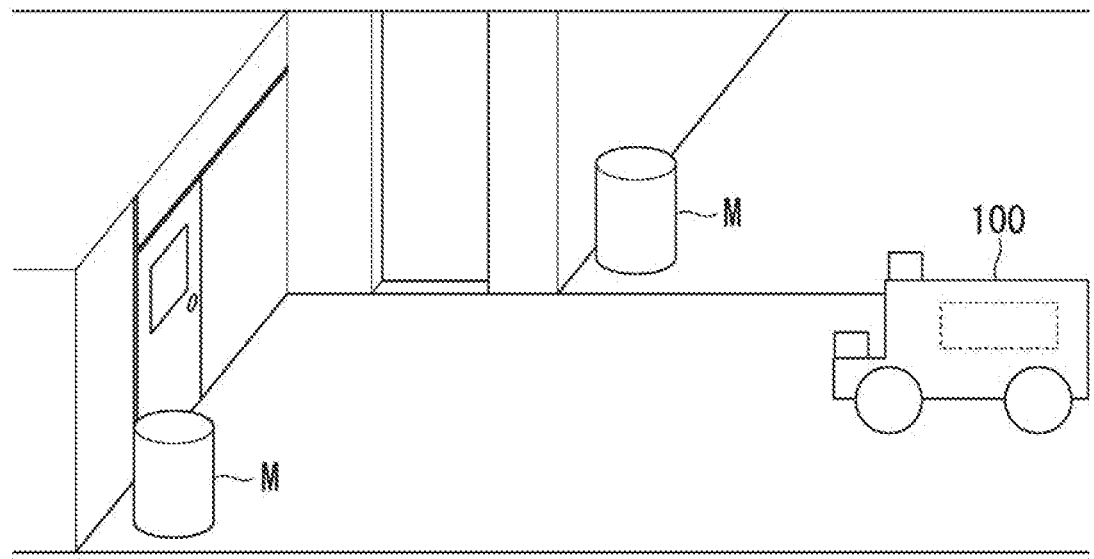
FIG. 4 is a diagram showing an example of the positional relationship between the foreign matter detection device and the surrounding environment at a certain point in time.
Figure 5:
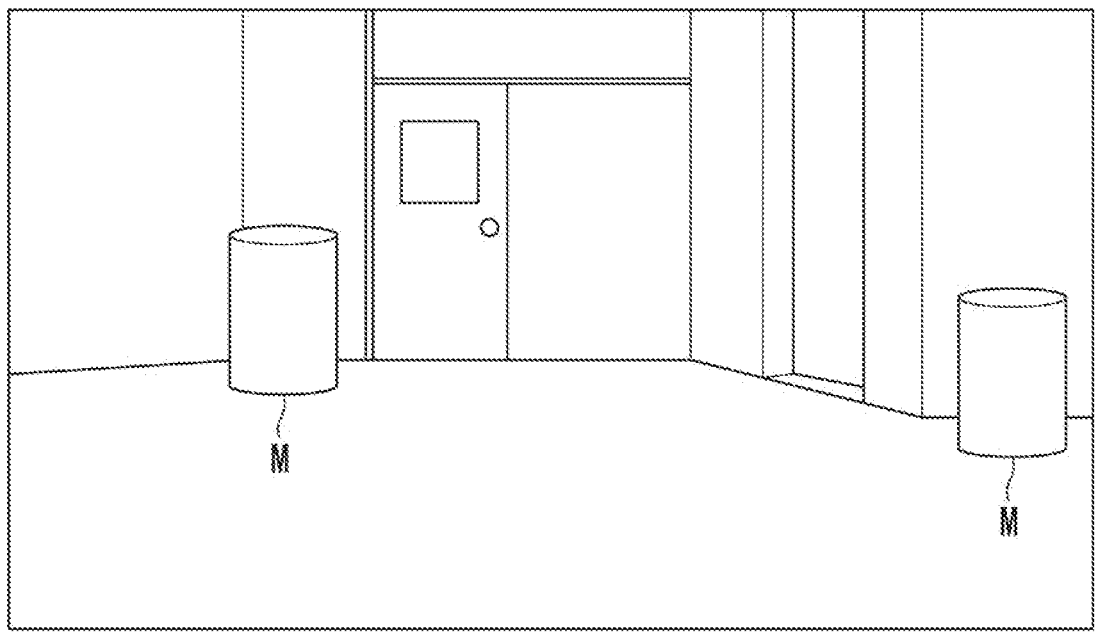
FIG. 5 is a diagram showing an example of an image that appears in the detection range of the foreign matter detection device at a certain point in time.

FIG. 4 is a diagram showing an example of the positional relationship between the foreign matter detection device and the surrounding environment at a certain point in time. FIG. 5 is a diagram showing an example of an image that appears in the detection range of the foreign matter detection device at a certain point in time.

Figure 6:
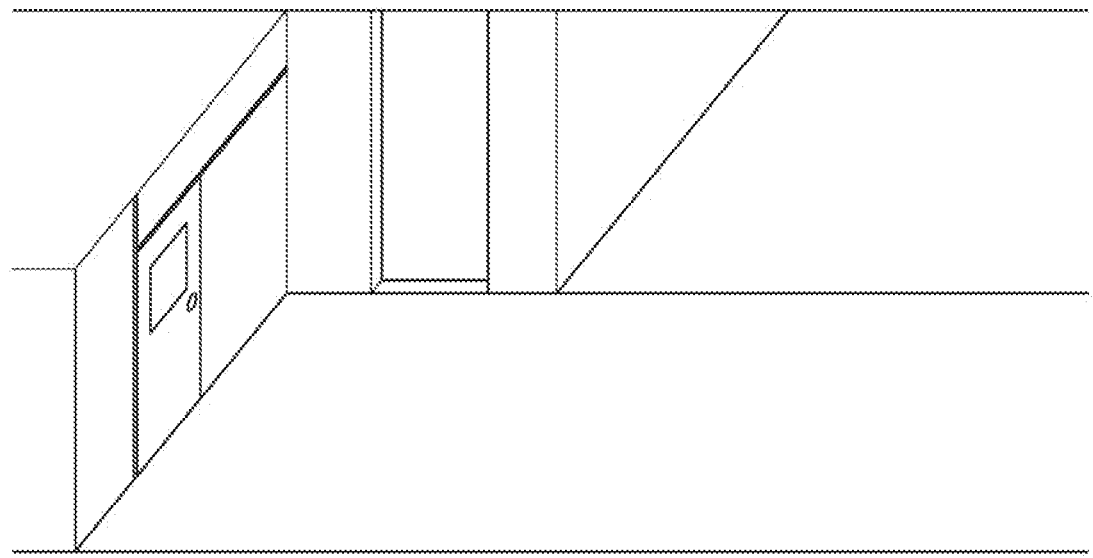
FIG. 6 is a diagram showing an example of known map data.
Figure 7:
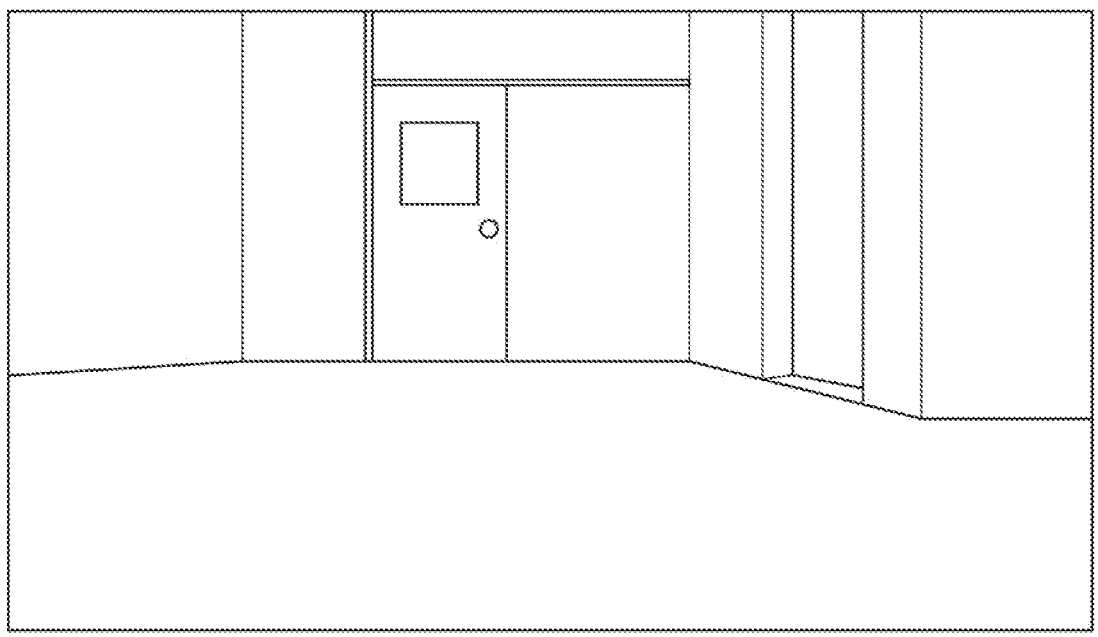
FIG. 7 is a diagram showing an example of map data obtained by cutting out the detection range of the foreign matter detection device from known map data.
Figure 8:
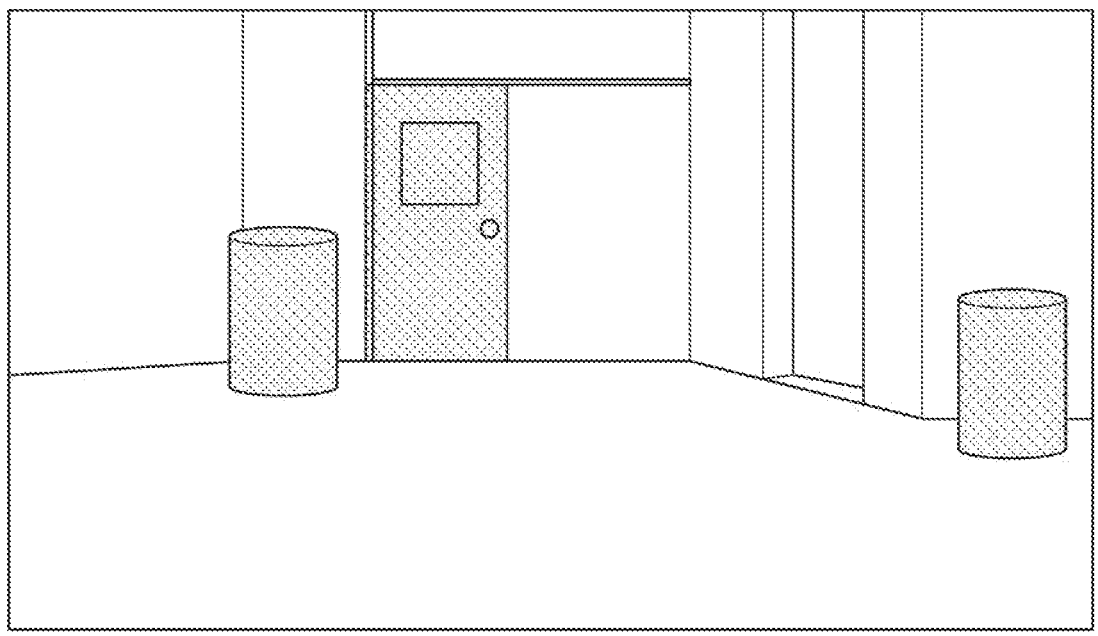
FIG. 8 is a diagram showing an example of a saliency map.
Figure 9:
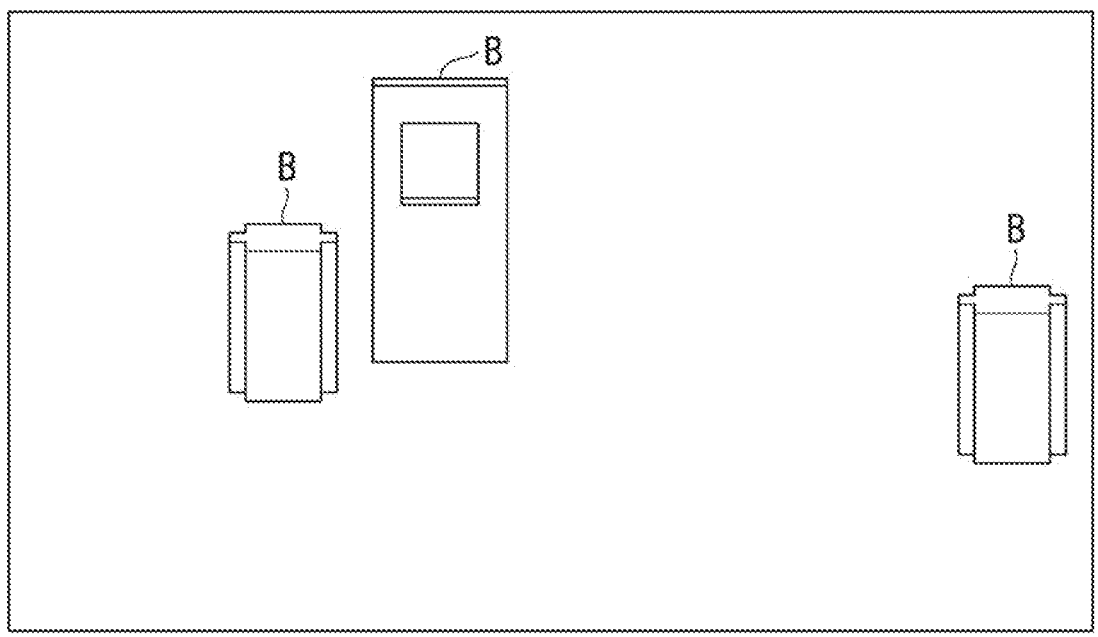
FIG. 9 is a diagram showing an example of voxel data.

FIG. 6 is a diagram showing an example of known map data. FIG. 7 is a diagram showing an example of map data from which detection ranges of the foreign matter detection device have been cut out from the known map data. FIG. 8 is a diagram showing an example of a saliency map. FIG. 9 is a diagram showing an example of voxel data.

For example, as shown in FIG. 4, it is assumed that the foreign matter detection device 100 is used in an environment in which two pieces of foreign matter M are present. In this case, the foreign matter detection device 100 obtains the image data as shown in FIG. 5 in Step S2. Further, the foreign matter detection device 100 generates a saliency map as shown in FIG. 8 by performing image processing based on the acquired image data in Step S3. In the saliency map shown in FIG. 8, the saliency of the pixels pertaining to the pieces of foreign matter M and the saliency of the pixels pertaining to the door are detected to be high.

In Step S6, the foreign matter detection device 100 extracts the partial point cloud data corresponding to the pixels whose saliency is higher than the threshold value, and in Step S7 converts the data to the voxel data shown in FIG. 9. Next, the foreign matter detection device 100 can obtain the map data shown in FIG. 7 by cutting out the detection ranges from the known map data shown in FIG. 6 based on the current position and orientation of the foreign matter detection device. The position and orientation of the foreign matter detection device 100 are estimated by, for example, SLAM. In Step S8, the foreign matter detection device 100 matches the voxel data shown in FIG. 9 with the map data shown in FIG. 7, and registers voxels excluding the voxels B existing in the known map data (the voxels B located at the door in the examples of FIGS. 7 and 9) in the foreign matter map.

Then, the foreign matter detection device 100 can identify the positions and sizes of the two pieces of foreign matter by performing clustering of the plurality of voxels registered in the foreign matter map.

<Action and Effect>

As described above, the foreign matter detection device 100 according to the first example embodiment extracts, on the basis of image data in which a detection range appears, partial point cloud data resulting from the removal of a portion of the point cloud data, the portion not being subject to a determination of being foreign matter or not, and determines the presence/absence of foreign matter in the detection range on the basis of the point cloud data. Thereby, the foreign matter detection device 100 can determine the presence/absence of foreign matter with a smaller amount of calculation as compared with the case where all point cloud data is used. The foreign matter detection device 100 according to the first example embodiment uses point cloud data as depth information, but is not limited thereto. For example, the foreign matter detection device 100 according to another example embodiment may use other three-dimensional data such as polygon data as depth information.

The foreign matter detection device 100 according to the first example embodiment extracts a portion of the point cloud data corresponding to a pixel whose saliency is higher than the threshold value in the saliency map generated from the image data as the partial point cloud data. Thereby, a portion that may be foreign matter can be appropriately extracted. In addition, another example embodiment is not limited thereto, and an object that may be foreign matter may be recognized by a general object identification technique instead of the saliency map.

Other Example Embodiments

Although example embodiments of the present invention have been described above with reference to the drawings, these are merely examples of the present invention, and combinations of the above example embodiments or various configurations other than the above may be adopted.

For example, in the above-described example embodiments, the foreign matter detection device 100 includes the robot 170 as a means of transportation, but it is not limited thereto. For example, the foreign matter detection device 100 according to another example embodiment may include a flying object such as a drone. Further, the foreign matter detection device 100 according to another example embodiment may not include a moving means, and a human may manually move the foreign matter detection device 100. Further, the foreign matter detection device 100 according to another example embodiment may detect foreign matter at a fixed position.

The foreign matter detection device 100 according to the above-described example embodiment obtains point cloud data, which is depth information, by the LiDAR 110, but it is not limited thereto. For example, the foreign matter detection device 100 according to another example embodiment may obtain depth information by using another depth measuring device such as a stereo camera or an IR camera instead of the LiDAR 110.

The foreign matter detection device 100 according to the above-described example embodiment includes the processing device 150 inside, but is not limited thereto. For example, the foreign matter detection device 100 according to another example embodiment may include the processing device 150 outside the robot 170.

<Hardware Configuration of Processing Device>

Each functional component unit of the processing device 150 may be realized by a single piece of hardware (for example, a hardwired electronic circuit), or a combination of hardware and software (for example, a combination of an electronic circuit and a program that controls the circuit). Hereinbelow, the case where each functional component of the foreign matter detection device 100 is realized by a combination of hardware and software will be further described.

Figure 10:
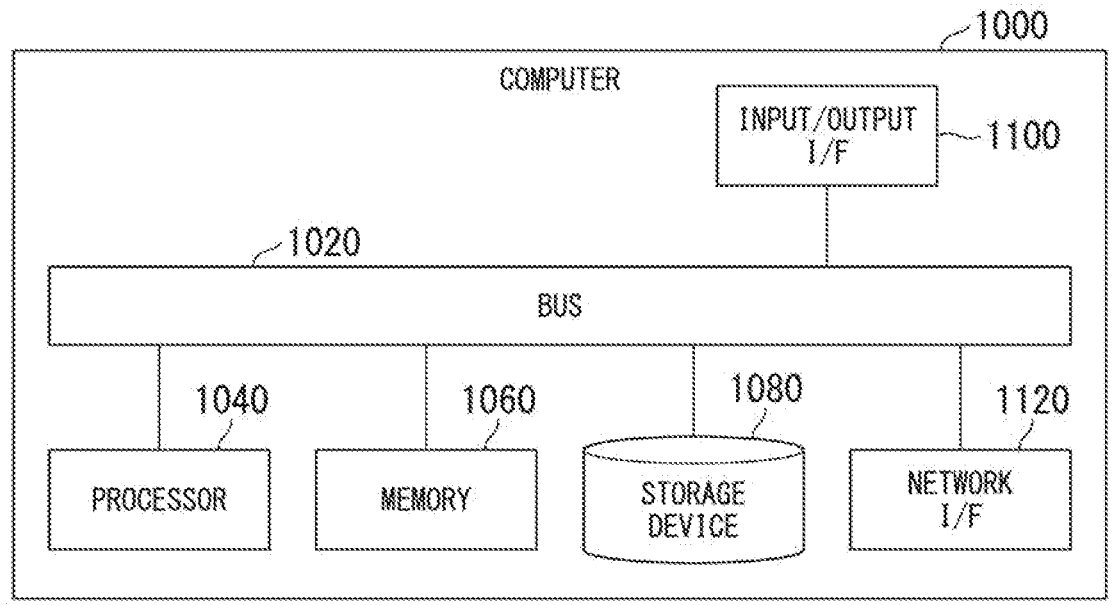
FIG. 10 is a diagram showing a hardware configuration of a computer for realizing a processing device according to at least one example embodiment.

FIG. 10 is a diagram showing a hardware configuration of a computer for realizing the processing device according to at least one example embodiment. A computer 1000 is any kind of computer. For example, the computer 1000 is realized as a processing chip such as a SoC (System on a Chip) built into the robot 170. The computer 1000 may be a dedicated computer designed to realize the foreign matter detection device 100, or may be a general-purpose computer.

The computer 1000 includes a bus 1020, a processor 1040, a memory 1060, a storage device 1080, an input/output interface 1100, and a network interface 1120.

The bus 1020 is a data transmission line for the processor 1040, the memory 1060, the storage device 1080, the input/output interface 1100, and the network interface 1120 to transmit and receive data to and from each other. However, the method of connecting the processor 1040 and the like to each other is not limited to a bus connection.

The processor 1040 is various processors such as a CPU (Central Processing Unit), a GPU (Graphics Processing Unit), and an FPGA (Field-Programmable Gate Array). The memory 1060 is a main storage device realized by using a RAM (Random Access Memory) or the like. The storage device 1080 is an auxiliary storage device realized by using a RAM, a ROM (Read Only Memory), or the like.

The input/output interface 1100 is an interface for connecting the computer 1000 and input/output devices. For example, at least the LiDAR 110 and the camera 130 are connected to the input/output interface 1100. Further, another input device and output device may be connected to the input/output interface 1100.

Further, when the computer 1000 is a processing chip built into the robot 170, an actuator of the robot 170 is connected to the input/output interface 1100. The computer 1000 controls the running of the robot 170 by transmitting control signals to the actuator via the input/output interface 1100. Further, various sensors (the LiDAR 110, camera 130, encoder, acceleration sensor, and the like) for ascertaining the state of the robot 170 are connected to the input/output interface 1100. The computer 1000 obtains observed values relating to the robot 170 by obtaining the detected values from the sensors via the input/output interface 1100.

The network interface 1120 is an interface for connecting the computer 1000 to the communication network. This communication network is, for example, a LAN (Local Area Network) or a WAN (Wide Area Network). The method of connecting the network interface 1120 to the communication network may be a wireless connection or a wired connection.

The storage device 1080 stores program modules that realize each functional component of the foreign matter detection device 100. The processor 1040 realizes the function corresponding to each program module by loading each of these program modules into the memory 1060 and executing the program modules.

When the foreign matter detection device 100 according to another example embodiment includes a processing device outside the robot 170, the network interface 1120 of the computer 1000 is connected to the control chip built into the robot 170. In this case, the foreign matter detection device 100 may be realized as a stationary computer such as a PC (Personal Computer) or a portable computer such as a smartphone.

The computer 1000 transmits an instruction to control the running of the robot 170 to the control chip of the robot 170 via the network. The control chip controls the running of the robot 170 by transmitting a control signal to the actuator according to the instruction received from the computer 1000. In addition, the computer 1000 acquires detected values for ascertaining the state of the robot 170 from various sensors provided in the robot 170 via a network. These detected values are transmitted, for example, via a control chip.

<Basic Configuration>

Figure 11:
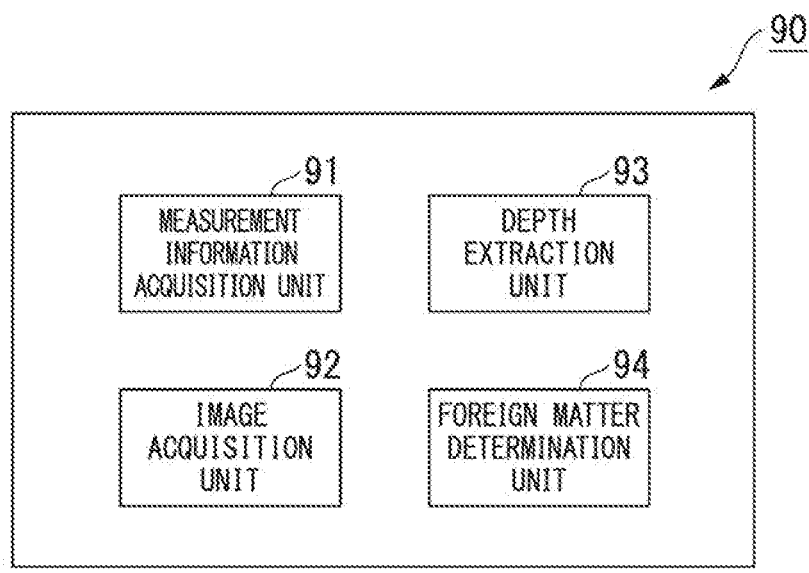
FIG. 11 is a schematic block diagram showing a basic configuration of a foreign matter detection device.

FIG. 11 is a schematic block diagram showing the basic configuration of the foreign matter detection device.

In the above-described example embodiment, the configuration shown in FIG. 2 has been described as an example embodiment of the foreign matter detection device 100, but the basic configuration of a foreign matter detection device 90 is as shown in FIG. 11.

That is, the foreign matter detection device 90 has a measurement information acquisition unit 91, an image acquisition unit 92, a depth extraction unit 93, and a foreign matter determination unit 94 as the basic configuration.

The measurement information acquisition unit 91 acquires depth information indicating the depth measured by a depth measuring device that measures the depth in the detection range. The measurement information acquisition unit 91 corresponds to the measurement information acquisition unit 151.

The image acquisition unit 92 acquires an image captured by an imaging device that images the detection range. The image acquisition unit 92 corresponds to the image acquisition unit 152.

The depth extraction unit 93 extracts, on the basis of the acquired image, partial depth information resulting from the removal of a portion of the depth information, the portion not being subject to a determination of being foreign matter or not. The depth extraction unit 93 corresponds to the point cloud extraction unit 155.

The foreign matter determination unit 94 determines the presence/absence of foreign matter in the detection range on the basis of the partial depth information. The foreign matter determination unit 94 corresponds to the foreign matter determination unit 159.

Thereby, the foreign matter detection device can realize the determination of foreign matter with a small amount of calculation.

INDUSTRIAL APPLICABILITY

The foreign matter detection device can realize determination of foreign matter with a small amount of calculation.

REFERENCE SYMBOLS

100: Foreign matter detection device
110: LiDAR

130: Camera
150: Processing device
151: Measurement information acquisition unit
152: Image acquisition unit
153: Saliency calculation unit
154: Preprocessing unit
155: Point cloud extraction unit
156: Point cloud conversion unit
157: Known map data storage unit
158: Difference extraction unit
159: Foreign matter determination unit
160: Output unit
170: Robot

What is claimed is:

1. A foreign matter detection device comprising:
at least one memory configured to store instructions; and
at least one processor configured to execute the instructions to:
acquire depth information indicating a depth in a detection range measured by a depth measurement device that measures the depth;
acquire an image of the detection range captured by an imaging device that captures the image;
extract partial depth information in which a portion not being subject to a determination of being foreign matter or not is removed from the depth information, based on the acquired image; and
determine presence or absence of foreign matter in the detection range based on the partial depth information.

2. The foreign matter detection device according to claim 1,
wherein the at least one processor is configured to execute the instructions to generate a saliency map based on the image, and
the at least one processor is configured to execute the instructions to extract a portion of the depth information corresponding to a pixel whose saliency is higher than a threshold value in the saliency map as the partial depth information.

3. The foreign matter detection device according to claim 1,
wherein the at least one processor is configured to execute the instructions to extract a difference between reference depth information indicating a depth when no foreign matter is present in the detection range and the partial depth information, and
wherein the at least one processor is configured to execute the instructions to determine the presence or absence of the foreign matter based on the extracted difference.

4. The foreign matter detection device according to claim 3, wherein the at least one processor is configured to execute the instructions to extract one or more clusters by a classification process of the difference, and specify a number and a position of the foreign matter based on the extracted cluster.

5. A foreign matter detection method comprising:
acquiring, by a computer, depth information indicating a depth in a detection range measured by a depth measurement device that measures the depth;
acquiring, by the computer, an image of the detection range captured by an imaging device that captures the image;
extracting, by the computer, partial depth information in which a portion not being subject to a determination of being foreign matter or not is removed from the depth information, based on the acquired image; and
determining, by the computer, presence or absence of foreign matter in the detection range based on the partial depth information.

6. A non-transitory computer readable recording medium that stores a program for causing a computer to execute:
acquiring depth information indicating a depth in a detection range measured by a depth measurement device that measures the depth;
acquiring an image of the detection range captured by an imaging device that captures the image;
extracting partial depth information in which a portion not being subject to a determination of being foreign matter or not is removed from the depth information, based on the acquired image; and
determining presence or absence of foreign matter in the detection range based on the partial depth information.

* * * * *